US010251057B2

United States Patent
Chen et al.

(10) Patent No.: US 10,251,057 B2
(45) Date of Patent: Apr. 2, 2019

(54) AUTHENTICATION FOR DEVICE CONNECTION USING VISIBLE PATTERNS

(71) Applicant: International Business Machines Corporation, Armonk, NY (US)

(72) Inventors: Chia-Yu Chen, White Plains, NY (US); Li-Wen Hung, Mahopac, NY (US); Jui-Hsin Lai, White Plains, NY (US); Ko-Tao Lee, White Plains, NY (US)

(73) Assignee: International Business Machines Corporation, Armonk, NY (US)

(*) Notice: Subject to any disclaimer, the term of this patent is extended or adjusted under 35 U.S.C. 154(b) by 143 days.

(21) Appl. No.: 15/249,715

(22) Filed: Aug. 29, 2016

(65) Prior Publication Data

US 2018/0063710 A1    Mar. 1, 2018

(51) Int. Cl.
| | |
|---|---|
| *G06F 21/00* | (2013.01) |
| *G06F 21/35* | (2013.01) |
| *G06F 21/36* | (2013.01) |
| *G06F 21/43* | (2013.01) |
| *G06F 21/44* | (2013.01) |
| *H04W 12/04* | (2009.01) |
| *H04W 12/06* | (2009.01) |

(52) U.S. Cl.
CPC ............ *H04W 12/06* (2013.01); *G06F 21/35* (2013.01); *G06F 21/36* (2013.01); *G06F 21/43* (2013.01); *G06F 21/44* (2013.01); *H04W 12/04* (2013.01)

(58) Field of Classification Search
CPC ....... H04W 12/06; H04W 12/04; G06F 21/35; G06F 21/36; G06F 21/43; G06F 21/44
USPC .......................................................... 726/7
See application file for complete search history.

(56) References Cited

U.S. PATENT DOCUMENTS

| | | | |
|---|---|---|---|
| 6,720,860 B1 | 4/2004 | Narayanaswami | |
| 7,822,981 B2 | 10/2010 | Zhang et al. | |
| 8,045,961 B2 | 10/2011 | Ayed et al. | |
| 8,294,559 B2 | 10/2012 | Yoshizawa et al. | |
| 8,540,149 B1* | 9/2013 | Chu | G07G 1/0045 235/375 |
| 8,941,854 B2 | 1/2015 | Park et al. | |
| 2005/0232417 A1* | 10/2005 | Roberts | H04N 1/32144 380/200 |

(Continued)

FOREIGN PATENT DOCUMENTS

| | | |
|---|---|---|
| GB | 2501069 A | 10/2013 |
| WO | WO2009017751 A1 | 2/2009 |

OTHER PUBLICATIONS

Alex Krizhevsky et al, ImageNet Classification with Deep Convolutional Neural Networks. Advances in Neural Information Processing Systems 25 (NIPS 2012). pp. 1-9.

*Primary Examiner* — Michael S McNally
(74) *Attorney, Agent, or Firm* — Daniel P. Morris; Otterstedt, Ellenbogen & Kammer, LLP

(57) ABSTRACT

Wireless communication is established between electronic devices by an initiating device transmitting a wireless communication request to a peripheral device; the initiating device detecting a visible electromagnetic pattern displayed on the peripheral device in response to the wireless communication request; the initiating device decoding the visible electromagnetic pattern to generate a passcode; and the initiating device echoing the passcode to the peripheral device to authenticate the wireless communication request without user intervention.

20 Claims, 5 Drawing Sheets

(56) References Cited

U.S. PATENT DOCUMENTS

| | | | |
|---|---|---|---|
| 2008/0126804 A1 | 5/2008 | Zhang | |
| 2008/0195863 A1* | 8/2008 | Kennedy | G06F 21/35 713/168 |
| 2008/0263361 A1* | 10/2008 | Dutta | H04L 9/0891 713/182 |
| 2010/0223461 A1* | 9/2010 | Drader | G09C 5/00 713/159 |
| 2011/0210171 A1* | 9/2011 | Brown | G06Q 20/3276 235/382 |
| 2011/0215921 A1 | 9/2011 | Ben Ayed | |
| 2013/0057897 A1 | 3/2013 | Park | |
| 2013/0080334 A1* | 3/2013 | Lee | G06Q 20/3274 705/76 |
| 2013/0256407 A1* | 10/2013 | Su | G06K 5/00 235/382 |
| 2013/0318587 A1 | 11/2013 | Shamsspoor | |
| 2014/0310764 A1* | 10/2014 | Tippett | G06F 21/31 726/1 |
| 2015/0228133 A1 | 8/2015 | Capaldi-Tallon | |
| 2016/0379072 A1* | 12/2016 | Fan | G06K 9/00248 382/118 |

* cited by examiner

AUTHENTICATION FOR DEVICE CONNECTION USING VISIBLE PATTERNS

FIELD

The present invention relates to secured wireless communication between electronic devices.

BACKGROUND

Wireless communication (e.g., Bluetooth®, a trademark of Bluetooth SIG, or Wi-Fi®, a trademark of the Wi-Fi Alliance) has become an accepted standard for transferring data between electronic devices. For example, a cellular phone or a laptop computer (an "initiating device") can be "paired" with other devices such as a printer, a speaker, an automobile stereo head, or another cellular phone or laptop computer ("peripheral devices") using wireless communication. "Pairing" two devices, in this context, means establishing a wireless network between the two devices. In establishing the paired relationship, the initiating device initiates the relationship and the peripheral device responds to the initiating device. Certain wireless communication protocols, e.g., Bluetooth, permit pairing only two devices; under other wireless communication protocols, e.g., Wi-Fi, it may be possible to pair more than two devices. Pairing can be entirely automatic (i.e. the peripheral device accepts the pairing request and establishes the wireless network without further steps) or it can be authenticated for enhanced security (i.e. the peripheral device and the initiating device conduct some sort of handshake protocol in order to verify a user's intent to pair the devices).

SUMMARY

Embodiments of the present invention provide techniques for authentication of device connections using visible patterns, without requiring a user to manually enter a passcode at the initiating device. In this context, "visible" denotes a pattern of light detectable by camera technology, e.g., CCD technology.

Thus, in one aspect, an exemplary method for establishing wireless communication between electronic devices is provided that includes an initiating device transmitting a wireless communication request to a peripheral device; the initiating device detecting a visible electromagnetic pattern displayed on the peripheral device in response to the wireless communication request; the initiating device decoding the visible electromagnetic pattern to generate a passcode; and the initiating device echoing the passcode to the peripheral device to authenticate the wireless communication request without user intervention.

In another aspect, an exemplary system for establishing wireless communication includes a communication module that transmits a communication request to the peripheral device and that echoes a passcode to the peripheral device to authenticate the communication request; a camera that detects a visible electromagnetic pattern displayed by the peripheral device; and a processor that generates the communication request and decodes the visible electromagnetic pattern to generate the passcode.

In another aspect, a non-transitory computer readable medium is provided with computer executable instructions, which when executed by a computer cause the computer to transmit a wireless communication request to a peripheral device, detect a visible electromagnetic pattern displayed on the peripheral device in response to the wireless communication request, decode the visible electromagnetic pattern to generate a passcode, and echo the passcode to the peripheral device to authenticate the wireless communication request without user intervention.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

convenient pairing of electronic devices with reduced user intervention, error free pairing of electronic devices, automated pairing of electronic devices.

These and other features and advantages of the present invention will become apparent from the following detailed description of illustrative embodiments thereof, which is to be read in connection with the accompanying drawings.

DETAILED DESCRIPTION

Figure 1:
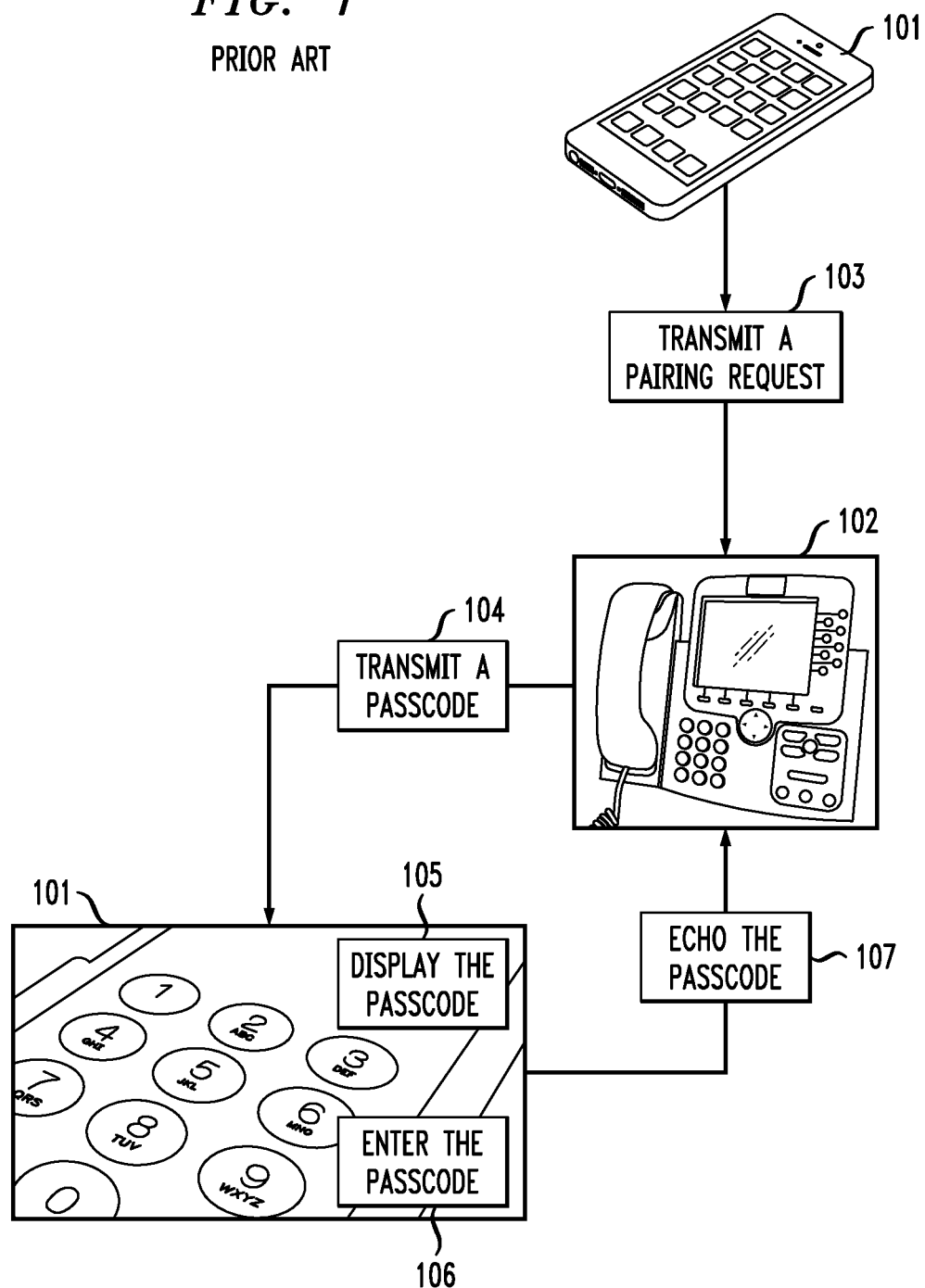
FIG. 1 illustrates an existing solution for pairing an initiating device with a peripheral device.

As noted, an electronic device such as a cellular phone or a laptop computer can be paired with a peripheral device. An existing solution for pairing is shown in FIG. 1. According to the existing solution, pairing an initiating device 101 to a peripheral device 102 requires transmitting 103 a pairing request from the initiating device to the peripheral device, transmitting 104 a passcode (alphanumeric) from the peripheral device back to the initiating device, displaying 105 the passcode at the initiating device, manually entering 106 the passcode at the initiating device, then echoing 107 the passcode from the initiating device back to the peripheral device, in order to authenticate a user's intent to establish a paired relationship. Challenges of the existing solution include mistaken entry of the passcode by the user and/or delayed entry of the passcode by the user, either of which results in the pairing being unsuccessful.

In contrast to the existing solution, the inventors have discovered it is feasible to securely pair an initiating device with a peripheral device, without requiring manual entry of a passcode at the initiating device. Such an automated solution for secure pairing obviates the challenges mentioned above, while maintaining security of pairing.

Figure 2:
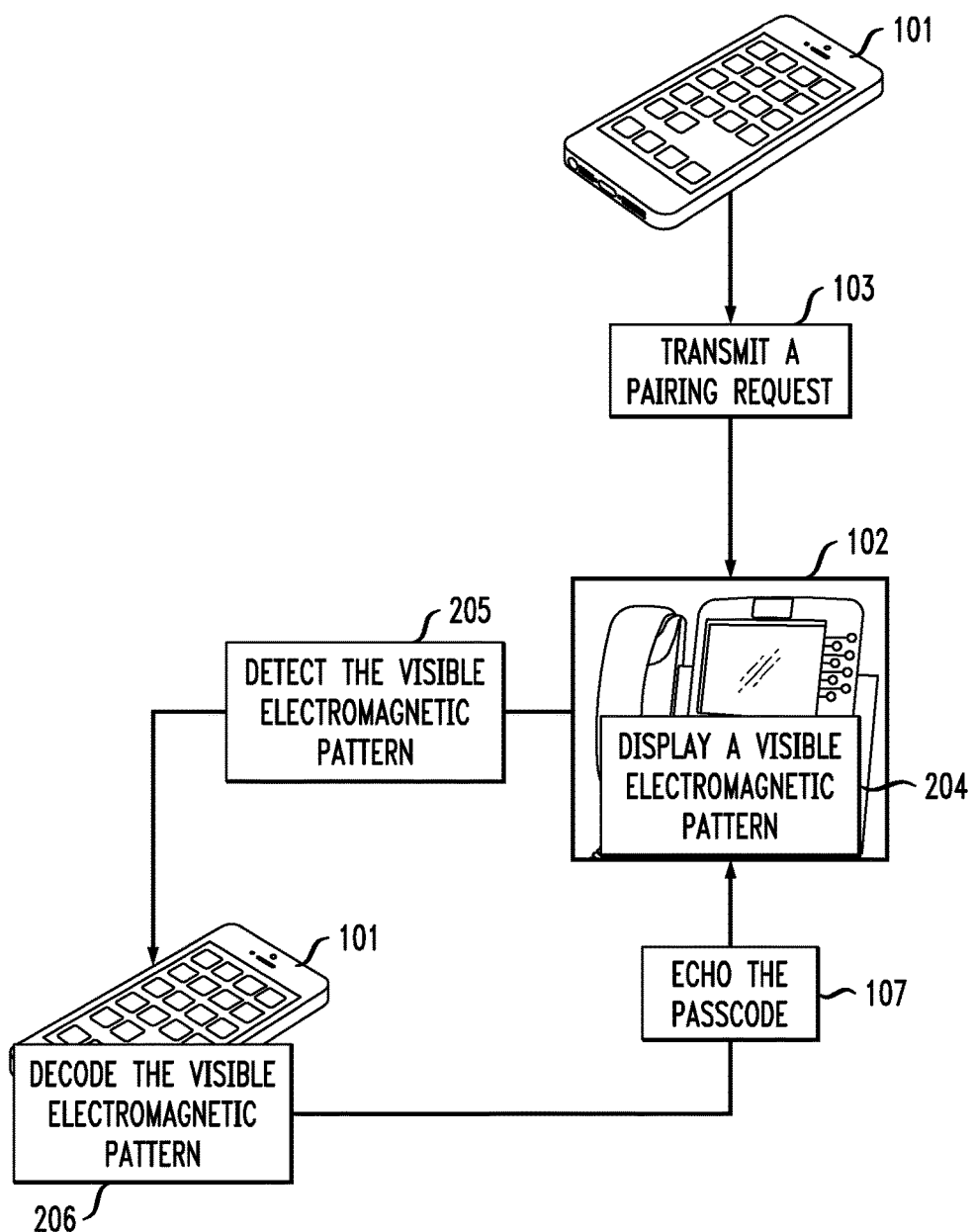
FIG. 2 illustrates an inventive solution for pairing an initiating device with a peripheral device, according to an embodiment of the invention.
Figure 3:
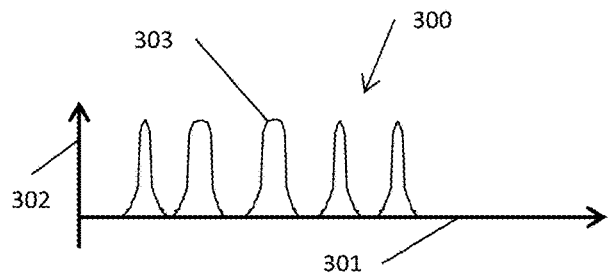
FIG. 3 illustrates a waveform of a flash signal for authenticating a pairing request, according to an embodiment of the invention.

FIG. 2 illustrates an inventive solution for pairing electronic devices, according to embodiments of the present invention. In FIG. 2, like components are numbered alike to the corresponding components of FIG. 1. First, the initiating device 101 transmits 103 a pairing request to the peripheral device 102. At this step, a camera of the initiating device 101 is directed toward the peripheral device 102. In response to the pairing request, the peripheral device 102 displays 204 a visible electromagnetic pattern (examples of which are shown in FIG. 3 and in FIG. 5). The initiating device 101 detects 205 and decodes 206 the visible electromagnetic pattern to obtain a passcode. The initiating device 101 then echoes 107 the passcode to the peripheral device 102, thereby authenticating the pairing request without user intervention.

The act of detecting 205 is facilitated by a video image capture function of the initiating device 101, which may be implemented as a kernel-level computation or as an add-on application. "Kernel-level" means software that is integral to the operating system of an electronic device; an "add-on application" is software running under the operating system. Video image capture functions, generally, are well-known and conventional in the art and are not further described herein.

One exemplary visible electromagnetic pattern may be a temporal sequence of flashes of light (a "flash signal") on the peripheral device 102. The flash signal may be produced, for example, by a discrete light (e.g., an indicator LED of the peripheral device) or by a grouping of pixels on a display screen of the peripheral device. The flash signal may be displayed in a single primary color (e.g., red, blue, green or magenta, yellow, cyan); in a combination color (e.g., "white" or "orange"); in a non-visible color (e.g., SWIR); or in a sequence of colors (e.g., "white" then "blue" then SWIR then "green"). Thus, in this context, "visible" denotes a pattern of light detectable by camera technology, e.g., CCD technology. FIG. 3 illustrates a waveform 300 of the flash signal. The X-axis 301 represents passage of time, while the Y-axis 302 represents intensity of the visible electromagnetic pattern. Each high step value 303 indicates a flash of light (significantly brighter than background lighting, e.g. at least fifty percent brighter), and the width of each high signal bar indicates the duration of each flash. Low step values of the waveform indicate no flash during the corresponding time slot. For embodiments in which the flash signal is displayed in a single primary color, or in a combination of primary colors, the initiating device 101 decodes 206 the flash signal waveform 300 by using special video image processing software that adapts a one-dimensional barcode standard (e.g., EAN/UPC) as further described with reference to FIG. 4.

Figure 4:
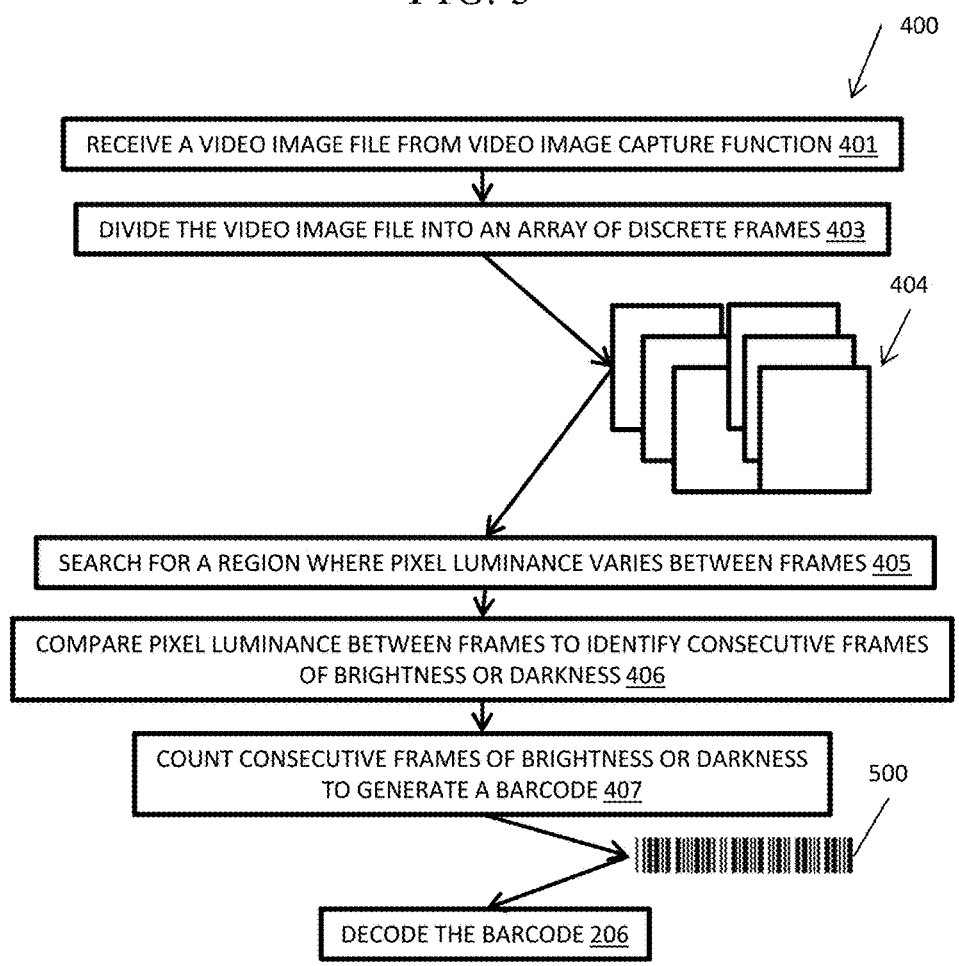
FIG. 4 illustrates a flowchart algorithm of special video image processing software for decoding the flash signal shown in FIG. 3, according to embodiments of the invention.

Referring now to FIG. 4, the initiating device 101 implements special video image processing software ("SVIPS") 400 to facilitate the act of decoding 206. The SVIPS 400 receives 401 a video image file from the conventional video image capture function of the initiating device 101. The SVIPS 400 divides 403 the video image file into an array of discrete frames 404. Across the array of discrete frames 404, the SVIPS 400 then searches 405 for a region in which the pixel luminance varies between frames 404 by an amount greater than a pre-determined threshold (e.g., more than fifty percent variance). Having identified such a region, the SVIPS 400 then compares 406 the pixel luminance within the region across the array of frames 404, in order to identify consecutive frames of brightness (corresponding to the dark bars 303 in FIG. 3) or of darkness (corresponding to the blank spaces between the dark bars 303). By counting 407 consecutive frames of brightness or darkness, the SVIPS 400 generates a barcode 500 and then decodes 206 the barcode according to an applicable standard (e.g., EAN/UPC standard) using software such as the Barcode Recognition SDK supplied by Inlite Research, Inc. By decoding 206 the barcode, the SVIPS 400 produces a passcode that the initiating device 101 then echoes 107 back to the peripheral device 102 in order to authenticate the pairing request without user intervention.

Figure 5:
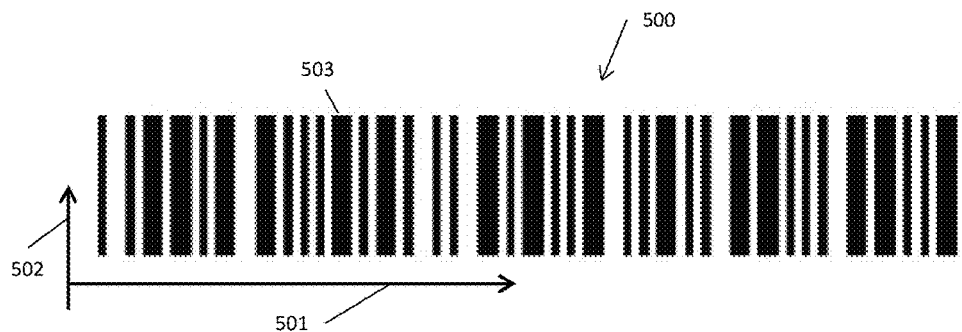
FIG. 5 illustrates a barcode pattern that is generated by the special video image processing software for authenticating a pairing request, according to an embodiment of the invention.

FIG. 5 illustrates the barcode 500 that is generated by the SVIPS 400. In FIG. 5, the X-axis 501 corresponds to the X-axis 301 of FIG. 3; each dark bar 503 corresponds to a high value of the waveform 300. Thus, the dark bars of the barcode 500 correspond to the flashes of light in the flash signal.

Figure 6:
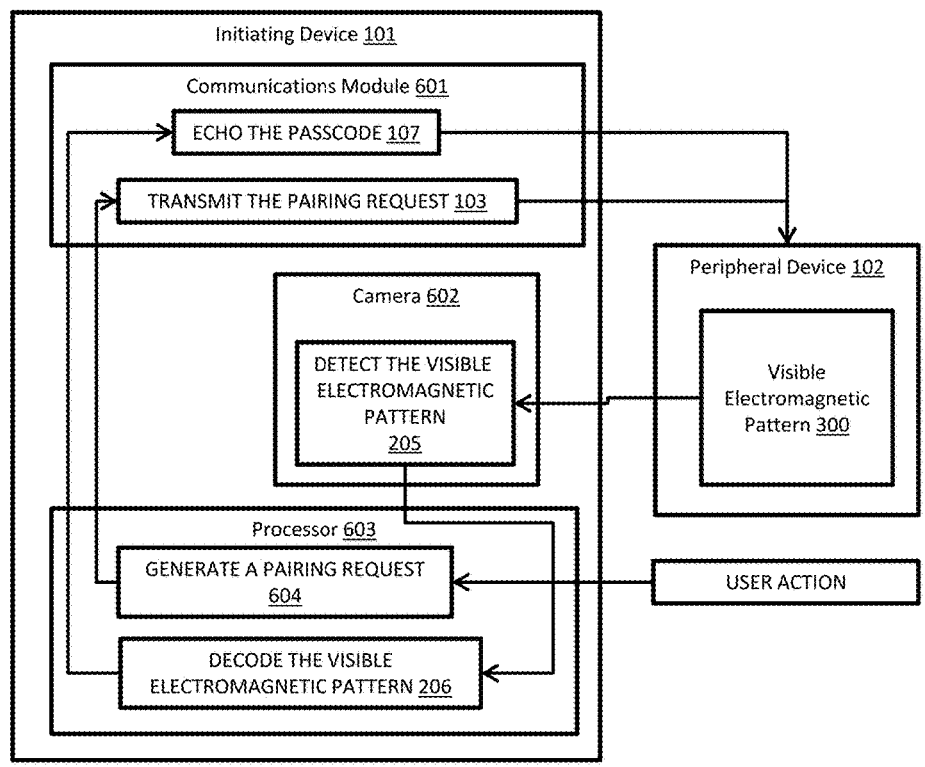
FIG. 6 illustrates components of an initiating device, according to embodiments of the invention.

Thus, referring to FIGS. 2 and 6, one or more embodiments provide the initiating device 101, which may be for example a cellular phone. In order to establish wireless communications with the peripheral device 102, the initiating device 101 performs certain steps, which in FIG. 6 are shown superimposed over the corresponding components of the initiating device 101. The initiating device 101 comprises a communications module 601, a camera 602, and a processor 603. The communications module 601 includes transmit and receive antennas and appropriate circuitry (e.g., an oscillator, a modulator, an amplifier, and a demodulator) in order to allow the initiating device 101 to establish two-way wireless communication with other devices. In response to a user action, the processor 603 generates 604 a communication request (e.g., a pairing request) and transmits 103 the pairing request to the peripheral device 102 via the communications module 601. The camera 602 then detects 205 a visible electromagnetic pattern (e.g., the flash signal 300) that the peripheral device 102 displays. The processor 603 decodes 206 the visible electromagnetic pattern 300 or 500 to generate a passcode, and echoes 107 the passcode back to the peripheral device 102 via the communications module 601, thereby authenticating the pairing request.

Figure 7:
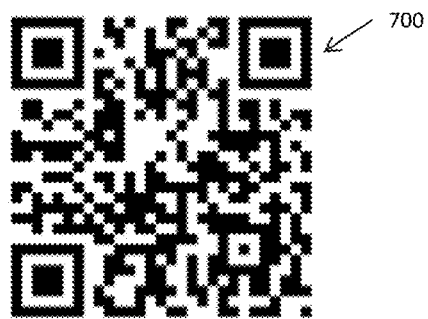
FIG. 7 illustrates a 2-D barcode image that is decoded to authenticate a pairing request, according to another embodiment of the invention.

FIG. 7 illustrates an embodiment in which the visible electromagnetic pattern 700 is a two dimensional barcode, for example, a barcode consistent with the GS1 QR standard (although other two dimensional barcode formats, such as High Capacity Color Barcode, are equally suitable). Referring again to FIG. 2, the initiating device 101 detects 205 and decodes 206 the visible electromagnetic pattern 700 (using conventional QR-recognition software, compliant with the GS1 QR standard, for example the ClearImage Barcode Recognition SDK supplied by Inlite Research, Inc.) to generate a passcode that the initiating device 101 then echoes 107 back to the peripheral device 102 in order to authenticate the pairing request without user intervention.

Referring back to FIG. 2, according to another embodiment the peripheral device 102 displays a sequence of images, which the initiating device 101 decodes 206 by reference to image recognition software such as Alexnet (U. Toronto, 2012) or Caffe (Berkeley Vision and Learning Center, 2014). In particular, the initiating device 101 uses the image recognition software to generate an image category index corresponding to each image out of the sequence of images, then concatenates the image category indices to provide a numeric passcode, which the initiating device then echoes 107 to the peripheral device 102. For example, an image classification method like AlexNet can classify 1000 image categories. The indexes of detected image categories can be used as the passcode. For example, detecting index "27" at time t=>index "36" at time t+1=>index "3" at tome t+2. Then, [27, 36, 3] can be used as the passcode.

Compared to existing systems, one advantage is that fewer user actions are required in order to establish a paired relationship of two electronic devices. In particular, a user no longer is required to view a passcode at a peripheral device or to enter the passcode at an initiating device. In certain circumstances, it may advantageously be possible to pair two electronic devices at a distance where a user is not able to view a passcode displayed by a peripheral device.

Thus, by way of review and summary, it will be appreciated that pairing of electronic devices in wireless communication is a fundamental technology for modern networking applications. For example, pairing requests are sent between cellular phones or laptops and various peripherals in order to establish ad hoc wireless networks for exchange of data, commands, and the like. This fundamental technology is limited, however, by an existing requirement for user interaction, which slows down the pairing process and introduces potential errors as well. Therefore, it will be helpful to add a solution in which the pairing process is automated, i.e. does not require user interaction in order to authenticate and complete a pairing request.

One or more embodiments of the invention implement a method, as shown in FIG. 2, in which an initiating device 101 transmits 103 a wireless communication request to a peripheral device 102; the wireless communication request may, for example, be a pairing request compliant with the Bluetooth® standard. The initiating device 101 detects 205 a visible electromagnetic pattern that is displayed on the peripheral device 102 in response to the wireless communication request, and decodes 206 the visible electromagnetic pattern to generate a passcode. The initiating device 101 then echoes 107 the passcode to the peripheral device 102 to authenticate the wireless communication request without user intervention.

In one or more embodiments, decoding 206 the visible electromagnetic pattern includes using a special video image processing software (SVIPS) 400 (as shown in FIG. 4) to capture 401 a sequence of flashes of light (a "flash signal"). The flash signal may be displayed in a single color, or in a sequence of colors. According to embodiments, the SVIPS 400 counts 407 consecutive frames of brightness or darkness to generate a virtual barcode 500. The SVIPS 400 then decodes the virtual barcode using barcode scanning software (e.g., EAN/IPC compliant barcode software). Alternatively, decoding 206 the visible electromagnetic pattern may include using barcode scanning software (e.g., EAN/UPC or QR compliant barcode software) to process a static barcode image, or using image recognition software (e.g., Caffe or Alexnet) to process a sequence of images (e.g., a slideshow or a video).

One or more embodiments, as shown for example in FIG. 6, provide an initiating device 101 that can establish wireless communication with a peripheral device 102. The initiating device 101 comprises a communication module 601 that transmits 103 a communication request to the peripheral device 102 and that echoes 107 a passcode to the peripheral device to authenticate the communication request. The initiating device 101 also comprises a camera 602 that detects a visible electromagnetic pattern 300 displayed by the peripheral device 102. A processor 604 of the initiating device 101 generates the communication request and decodes the visible electromagnetic pattern to generate the passcode. Generally, the camera 602 detects the visible electromagnetic pattern after the communication module transmits 103 the communication request, however, this does not preclude pre-authentication by first detecting the electromagnetic pattern and then transmitting the communication request and echoing the passcode.

One or more embodiments of the invention, or elements thereof, can be implemented in the form of an apparatus including a memory and at least one processor that is coupled to the memory and operative to perform exemplary method steps.

Figure 8:
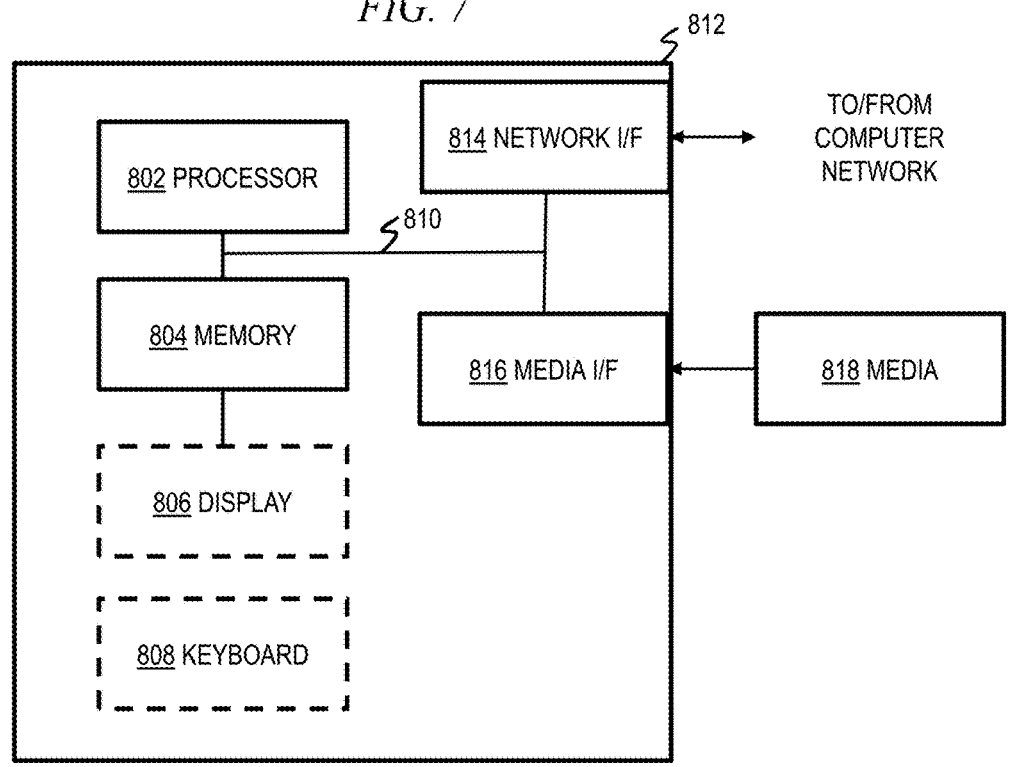
FIG. 8 shows an exemplary computer system, configured to implement aspects of the invention.

One or more embodiments can make use of software running on a general purpose computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 812 as shown in FIG. 8) running a server program. It will be understood that such a physical server may or may not include a di splay and keyboard.

As noted, aspects of the present invention may take the form of a computer program product embodied in one or more non-transitory computer readable medium(s) having computer readable program code embodied thereon. Any combination of one or more computer readable medium(s) may be utilized. A non-transitory computer readable storage medium may be, for example, but not limited to, an electronic, magnetic, optical, electromagnetic, infrared, or semiconductor system, apparatus, or device, or any suitable combination of the foregoing. Media block 818 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Thus, one or more embodiments provide a non-transitory computer readable medium comprising computer executable instructions which when executed by a computer cause the computer to transmit a wireless communication request to a peripheral device; detect a visible electromagnetic pattern displayed on the peripheral device in response to the wireless communication request; decode the visible electromagnetic pattern to generate a passcode; and echo the passcode to the peripheral device to authenticate the wireless communication request without user intervention.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, and to enable others of ordinary skill in the art to understand the embodiments disclosed herein.

What is claimed is:

1. A method comprising:
    an initiating device transmitting a wireless communication request to a peripheral device;
    the initiating device detecting a visible electromagnetic pattern displayed on the peripheral device in response to the wireless communication request, wherein the visible electromagnetic pattern is a time sequence of video images;
    the initiating device decoding the visible electromagnetic pattern, using image recognition software, to generate a passcode that incorporates numeric indices of image categories detected by the image recognition software; and
    the initiating device echoing the passcode to the peripheral device to authenticate the wireless communication request without user intervention.

2. The method of claim 1 wherein the visible electromagnetic pattern is a flash signal.

3. The method of claim 2 wherein the visible electromagnetic pattern is displayed in a single color.

4. The method of claim 2 wherein the visible electromagnetic pattern is displayed as a slideshow or sequence of images of a type that image recognition software can categorize.

5. The method of claim 2 wherein the initiating device decodes the visible electromagnetic pattern according to EAN/UPC barcode standard.

6. The method of claim 1 wherein the visible electromagnetic pattern is displayed in a single color.

7. The method of claim 1 wherein the visible electromagnetic pattern is displayed as a 2-D barcode.

8. The method of claim 1 wherein the visible electromagnetic pattern is displayed as a sequence of images.

9. The method of claim 1, further comprising the peripheral device displaying the visible electromagnetic pattern in response to the wireless communication request.

10. The method of claim 1, wherein the wireless communication request is a pairing request compliant with the Bluetooth® standard.

11. The method of claim 1, further comprising providing a system, wherein the system comprises an initiating module, a detecting module, a decoding module, and an echoing module, wherein:
    said transmitting a wireless communication request is carried out by said initiating module executing on at least one hardware processor;
    said detecting a visible electromagnetic pattern is carried out by said detecting module executing on said at least one hardware processor;

said decoding the visible electromagnetic pattern is carried out by said decoding module executing on said at least one hardware processor; and said echoing the passcode is carried out by said detecting module executing on said at least one hardware processor.

12. An initiating device for establishing wireless communication with a peripheral device, comprising:

a communication module that transmits a communication request to the peripheral device and that echoes a passcode to the peripheral device to authenticate the communication request;

a camera that detects a visible electromagnetic pattern displayed by the peripheral device; and a processor that generates the communication request and decodes the visible electromagnetic pattern to generate the passcode, wherein the visible electromagnetic pattern is a time sequence of video images and the processor implements image recognition software to decode the visible electromagnetic pattern, wherein the passcode incorporates numeric indices of image categories detected by the image recognition software.

13. The device of claim 12 wherein the camera detects the visible electromagnetic pattern after the communication module transmits the communication request.

14. The device of claim 12 wherein the visible electromagnetic pattern is a flash signal.

15. The device of claim 14 wherein the visible electromagnetic pattern is displayed as a slideshow or sequence of images of a type that image recognition software can categorize.

16. The device of claim 14 wherein the processor decodes the visible electromagnetic pattern according to EAN/UPC barcode standard.

17. The device of claim 12 wherein the processor decodes the visible electromagnetic pattern according to EAN/UPC barcode standard.

18. A non-transitory computer readable medium comprising computer executable instructions which when executed by a computer cause the computer to perform the method of:

transmitting a wireless communication request to a peripheral device;

detecting a visible electromagnetic pattern displayed on the peripheral device in response to the wireless communication request, wherein the visible electromagnetic pattern is a time sequence of video images;

decoding the visible electromagnetic pattern, using image recognition software, to generate a passcode that incorporates numeric indices of image categories detected by the image recognition software; and echoing the passcode to the peripheral device to authenticate the wireless communication request without user intervention.

19. The non-transitory computer readable medium of claim 18 wherein decoding the visible electromagnetic pattern incorporates the EAN/UPC barcode standard.

20. The non-transitory computer readable medium of claim 18 wherein the wireless communication request is a pairing request compliant with the Bluetooth® standard.

* * * * *